United States Patent
Kim

(10) Patent No.: US 9,613,590 B2
(45) Date of Patent: Apr. 4, 2017

(54) DISPLAY APPARATUS AND DISPLAY CONTROL APPARATUS

(71) Applicant: Samsung Display Co., Ltd., Yongin (KR)

(72) Inventor: Minweun Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 16 days.

(21) Appl. No.: 14/660,297

(22) Filed: Mar. 17, 2015

(65) Prior Publication Data
US 2016/0118021 A1    Apr. 28, 2016

(30) Foreign Application Priority Data

Oct. 28, 2014   (KR) .................... 10-2014-0147622

(51) Int. Cl.
  *G09G 5/10* (2006.01)
  *G06K 9/62* (2006.01)
  *G09G 3/36* (2006.01)

(52) U.S. Cl.
  CPC ............. *G09G 5/10* (2013.01); *G06K 9/6201* (2013.01); *G09G 3/3648* (2013.01); *G09G 2320/046* (2013.01); *G09G 2340/16* (2013.01); *G09G 2360/16* (2013.01)

(58) Field of Classification Search
  None
  See application file for complete search history.

(56) References Cited

U.S. PATENT DOCUMENTS

| | | | | |
|---|---|---|---|---|
| 2005/0206660 A1* | 9/2005 | Kanai | .................. | G09G 3/2081 345/691 |
| 2007/0236431 A1* | 10/2007 | Tada | ................... | G09G 3/3208 345/84 |
| 2008/0088650 A1* | 4/2008 | Chen | .................... | G09G 3/2025 345/690 |
| 2008/0272999 A1* | 11/2008 | Kurokawa | ........... | G09G 3/3406 345/89 |
| 2009/0147032 A1 | 6/2009 | Kim | | |
| 2010/0060554 A1 | 3/2010 | Koh et al. | | |
| 2010/0214309 A1* | 8/2010 | Bae | ...................... | G09G 3/3655 345/589 |
| 2010/0302287 A1* | 12/2010 | Katayama | ........... | G09G 3/3648 345/690 |

(Continued)

FOREIGN PATENT DOCUMENTS

| | | |
|---|---|---|
| KR | 10-2009-0058788 | 6/2009 |
| KR | 10-2010-0030978 | 3/2010 |

(Continued)

*Primary Examiner* — Ryan M Gray
(74) *Attorney, Agent, or Firm* — H.C. Park & Associates, PLC

(57) ABSTRACT

A display apparatus includes: a frame buffer which stores reference image data; a reception unit which receives input image data; a counter managing unit which calculates a first counter value of each pixel based on a difference between gradation values of the reference image data and the input image data; a correction unit which corrects the input image data per pixel based on the calculated first counter value and generates corrected image data; and a display which displays an image corresponding to the corrected image data.

15 Claims, 5 Drawing Sheets

(56) References Cited

U.S. PATENT DOCUMENTS

| | | | | |
|---|---|---|---|---|
| 2011/0273489 | A1* | 11/2011 | Inoue | G09G 3/3611 |
| | | | | 345/690 |
| 2013/0162698 | A1* | 6/2013 | Sasaki | G09G 5/10 |
| | | | | 345/690 |
| 2013/0176324 | A1* | 7/2013 | Yamashita | G09G 5/02 |
| | | | | 345/589 |
| 2014/0028739 | A1* | 1/2014 | Takahashi | G09G 3/2003 |
| | | | | 345/690 |
| 2015/0279294 | A1* | 10/2015 | Inada | G09G 3/3614 |
| | | | | 345/693 |

FOREIGN PATENT DOCUMENTS

| | | |
|---|---|---|
| KR | 10-2011-0078716 | 7/2011 |
| KR | 10-2012-0075030 | 7/2012 |
| KR | 10-2013-0095500 | 8/2013 |

* cited by examiner

DISPLAY APPARATUS AND DISPLAY CONTROL APPARATUS

CROSS REFERENCE TO RELATED APPLICATION

This application claims priority from and the benefit of Korean Patent Application No. 10-2014-0147622, filed on Oct. 28, 2014, which is hereby incorporated by reference for all purposes as if fully set forth herein.

BACKGROUND

Field

Exemplary embodiments of the present invention relate to a display apparatus and a display control apparatus.

Discussion of the Background

Flat panel displays such as liquid crystal displays and organic light-emitting displays typically are thinner and lighter than conventional displays. These characteristics of flat panel displays facilitate the portability of electronic products including such displays and also make implementing large screen and high-resolution displays easier.

A typical organic light-emitting display uses organic light-emitting diodes (OLEDs) which emit light due to recombination of electrons and holes to display an image. The typical organic light-emitting display includes pixels arranged in a matrix form in areas where scanning lines and data lines cross each other.

SUMMARY

Exemplary embodiments of the present invention provide a display apparatus and a display control apparatus.

Additional aspects will be set forth in part in the description which follows and, in part, will be apparent from the description, or may be learned by practice of the presented embodiments.

An exemplary embodiment of the present invention discloses a frame buffer which stores reference image data, a reception unit which receives input image data; a counter managing unit which calculates a first counter value of each pixel based on a difference between gradation values of the reference image data and the input image data, a correction unit which corrects the input image data per pixel based on the calculated first counter value and generates corrected image data, and a display which displays an image corresponding to the corrected image data.

An exemplary embodiment of the present invention also discloses a display control apparatus including a frame buffer which stores reference image data, a reception unit which receives input image data, a counter managing unit which calculates a first counter value of each pixel based on a difference between gradation values of the reference image data and the input image data, and a correction unit which generates corrected image data by correcting the input image data per pixel based on the first counter value.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
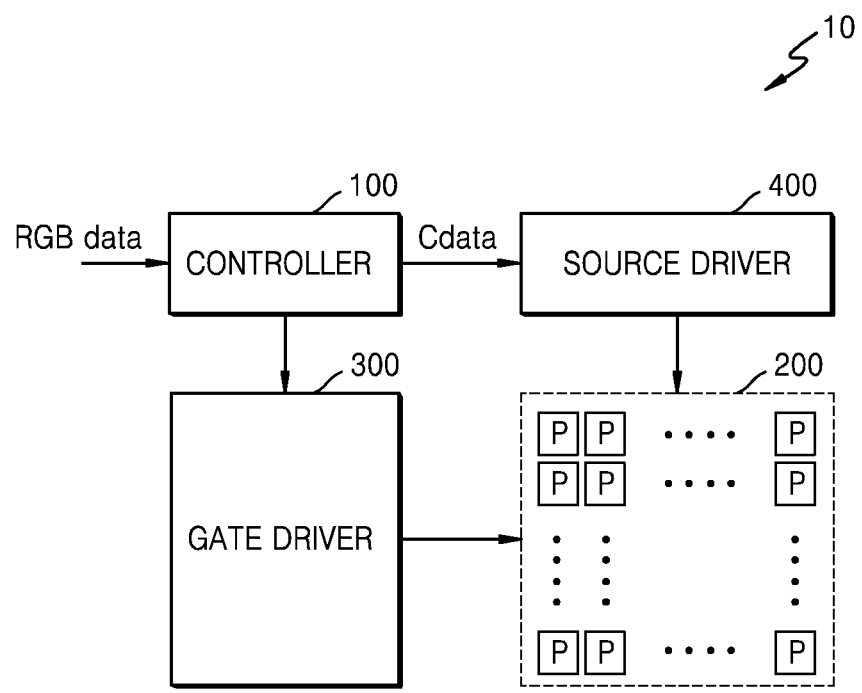
FIG. 1 is a block diagram of a display apparatus according to an exemplary embodiment of the present invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of the related art are omitted when it is deemed that they may unnecessarily obscure the essence of the invention.

Hereinafter, the present invention will be described in detail by explaining preferred embodiments of the invention with reference to the attached drawings. Like reference numerals in the drawings denote like elements, and descriptions thereof will be omitted.

While such terms as "first", "second", etc., may be used to describe various components, such components must not be limited to the above terms. The above terms are used only to distinguish one component from another. An expression used in the singular encompasses the expression of the plural, unless it has a clearly different meaning in the context. In the present specification, it is to be understood that the terms such as "including", "having", and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Flat panel display apparatuses may include liquid crystal display apparatuses, field emission display (FED) apparatuses, plasma display apparatuses, organic light-emitting display apparatuses, etc. In the present application, exemplary embodiments of the present invention will be described with respect to an organic light-emitting display apparatus. However, the present invention is not limited thereto.

FIG. 1 is a block diagram of a display apparatus 10 according to an exemplary embodiment of the present invention.

Referring to FIG. 1, the display apparatus 10 includes a display 200, a gate driver 300, a source driver 400, and a controller 100.

The controller 100 may receive red, green, and blue (RGB) data and may control the gate driver 300 and the source driver 400 such that an image corresponding to the RGB data may be displayed on the display 200. The controller 100 may calculate a first counter value for each pixel by considering a difference in gradation values between reference image data and input image data and may generate corrected image data (Cdata) by correcting the input image data for each pixel based on the calculated first counter value. The controller 100 may provide the Cdata to the source driver 400. The controller 100 may be referred to as a display control apparatus.

The input image data may be RGB data received by the controller 100, and may be an uncorrected version of Cdata. The reference image data is RGB data comparable to the input image data and may include pieces of frame data selected from among the frame data of the RGB data in a predetermined time cycle (for example, a first time cycle). In exemplary embodiments of the present invention, the input image data may be current frame data of the RGB data, that is, the currently inputted frame data, and the reference image data may be previous frame data to be compared to the current frame data. The previous frame data is frame data which is received earlier than the current frame data and is frame data which is received before the first time cycle with respect to a point of time when the current frame data is received.

The controller 100 may include a storage unit, for example, a frame buffer, which stores the reference image data. The controller 100 may include a reception unit which receives external input image data. The reception unit may be a frame memory which temporarily stores the RGB data. The RGB data may be stored in the frame memory for each frame, and may be referred to as "input image data." The input image data stored in the frame memory may be moved to and stored in the frame buffer in the first time cycle. The RGB data stored in the frame buffer may be referred to as "reference image data."

The controller 100 may compare a gradation value of the reference image data stored in the frame buffer and a gradation value of the input image data stored in the frame memory for each pixel. Each of the reference image data and the input image data may be understood as a set of gradation values for pixels P of the display 200. The controller 100 may calculate a first counter value of each pixel based on differences between the gradation values of the reference image data and the input image data.

For example, with regard to a pixel (for example, a first pixel) for which the gradation value of the reference image data is different from that of the input image data, a first counter value corresponding to the first pixel may be 0. With regard to a pixel (for example, a second pixel) for which the gradation value of input image data is the same as the gradation value of the reference image data, the first counter value may be increased by a value determined based on a gradation value of the second pixel. An operation for increasing the first counter value may be performed, for example, in the first time cycle. The controller 100 may calculate first counter values for all pixels P.

The first counter value may be increased in proportion to a time when a pixel (for example, the second pixel) emits light at a constant brightness. That is, the first counter value may be increased in proportion to a gradation value (for example, a gradation value of the second pixel) corresponding to the constant brightness. For example, when still images are input for a predetermined time, the pixels P may emit light for a predetermined time at a constant brightness. The first counter value corresponding to each pixel P may be increased based on a gradation value of each pixel P and the predetermined time. However, when a still image is displayed in the image display area of the display 200, such as an image like a logo of a broadcasting company being constantly displayed in an upper right area of a television screen for a long time, first counter values corresponding to pixels where the image is displayed may be increased in proportion to a time during which the image is displayed and gradation values corresponding to the image. When pixels emit light at a constant brightness for a long time, driving transistors of the pixels have great delay because of hysteresis effect. Thus, when data signals corresponding to new gradation values, which are different from the above gradation values, are applied to the pixels, the pixels may not emit light exactly at a brightness corresponding to the new gradation values. For example, when the pixels that have displayed a white color for a long time and then display a grey color, the grey color may have a lower brightness than desired.

The controller 100 may generate the Cdata by correcting the input image data per pixel based on the first counter value. For example, if the gradation value of a pixel (for example, a first pixel) of the reference image data is different from the gradation value of the input image data, a gradation value of the first pixel may be corrected to a corrected gradation value based on a first counter value corresponding to the first pixel. For example, when the counter value corresponding to the first pixel is equal to 5, the corrected gradation value may be 138 if the gradation value of the first pixel was 128. The corrected gradation value determined according to the first counter value and the gradation value may be stored in a look-up table. The corrected gradation value may be determined by using a formula which includes the first counter value and the gradation value. If the gradation value of a pixel (for example, a second pixel) of input image data is the same as the gradation value of the reference image data, a gradation value of the second pixel may remain the same without being corrected. That is, a corrected gradation value of the second pixel may be the same as the gradation value of the second pixel. The controller 100 may generate the Cdata by correcting the gradation values of all pixels P based on the first counter value. The controller 100 may provide the Cdata to the source driver 400.

The gate driver 300 receives control signals from the controller 100 and may output scanning signals to the display 200 according to the control signals.

The source driver 400 may receive the Cdata and the control signals from the controller 100 and may output data signals, which are synchronized with the scanning signals according to the control signals and correspond to the Cdata, to the display 200.

The display 200 includes a plurality of pixels P configured to display an image and may receive the Cdata from the source driver 400. Also, the display 200 may display an image via the pixels P corresponding to the Cdata.

Figure 2:
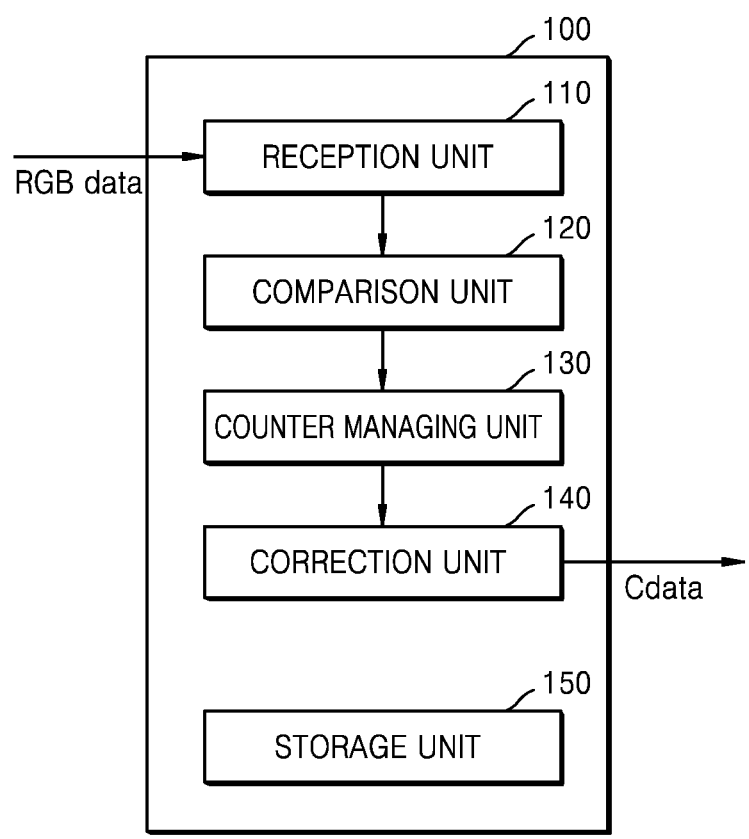
FIG. 2 is a schematic block diagram of a controller according to an exemplary embodiment of the present invention.

FIG. 2 is a schematic block diagram of the controller 100 according to an exemplary embodiment of the present invention.

Referring to FIG. 2, the controller 100 includes a reception unit 110, a comparison unit 120, a counter managing unit 130, a correction unit 140, and a storage unit 150.

The reception unit 110 receives external input image data RGB data. The reception unit 110 may be a frame memory which stores input image data of a single frame.

The storage unit 150 may store reference image data. The storage unit 150 may include a frame buffer which stores the reference image data. The reference image data may be a frame data selected from among the input image data RGB data in a predetermined time cycle (for example, a first time cycle).

The comparison unit 120 may compare a gradation value of the reference image data and a gradation value of the input image data RGB data. The comparison unit 120 may compare the input image data RGB data of each frame received by the reception unit 110 to the reference image data stored in the storage unit 150 for each pixel.

The counter managing unit 130 may calculate a first counter value of each pixel by considering a difference between the gradation values of the reference image data and the input image data RGB data. The counter managing unit 130 may calculate the first counter value of each pixel by comparing the gradation value of the input image data RGB data to the gradation value of the reference image data and may calculate a second counter value, which is used to generate corrected image data, based on the first counter value.

If the gradation value of the reference image data is the same as the gradation value of the input image data RGB data which is input during a predetermined time cycle (for example, a first time cycle), the first counter value may be increased based on the gradation value of the input image data RGB data. That is, the first counter value may be determined based on the gradation values of the input image data RGB data in a period when gradation values of pixels have remained the same.

The input image data RGB data which is input in a predetermined time cycle (for example, a first time cycle) may be referred to as first image data so that the above input image data may be compared to input image data which is input at a different time in the first time cycle. Also, the input image data which is input at a different time in the first time cycle may be referred to as second image data. When it is unnecessary to classify the input image data into the first image data and the second image data, the first image data and the second image data may be collectively referred to as input image data RGB data.

If the gradation value of the reference image data is different from the gradation value of the input image data RGB data, the second counter value may be determined based on the first counter value. The second counter value may be used to generate corrected image data and may be used to determine a correction value and a correction period of the gradation value of the input image data RGB data. The second counter value may be decreased after the gradation values of the pixels are corrected based on the second counter value until the second counter value becomes 0.

First, an operation for determining the first counter value by considering the difference between the gradation values of the reference image data and the gradation values of the input image data RGB data will be described. If the gradation value of a pixel (for example, a third pixel) of the reference image data is the same as the gradation value of the first image data, the counter managing unit 130 may increase a first counter value corresponding to the third pixel by an increment corresponding to the third pixel, based on a gradation value of the third pixel. The first counter value may be increased in a predetermined time cycle (for example, a first time cycle). For example, the first time cycle may be one minute or several seconds. Although the gradation value of the reference image data may be the same as a gradation value of the input image data which is input at the different time in the first time cycle, the first counter value may not be increased. The first counter value may be determined based on the gradation value of the third pixel. For example, when the gradation value of the third pixel is equal to 255, the first counter value is increased by 1, and when the gradation value of the third pixel is equal to 128, the first counter value is increased by 0.5.

If the gradation value of a pixel (for example, a fourth pixel) of the reference image data is different from the gradation value of the first image data, an operation may be performed that is the same as that performed for a pixel for which the gradation value in the reference image data is different from that of the second image data. For example, if a gradation value of a pixel of the reference image data is different from that of the input image data RGB data, the second counter value may be determined based on the first counter value, and the first counter value may be initialized to 0. If the first counter value is equal to 0, the second counter value may not be corrected based on the first counter value, and the gradation value of the first pixel may be corrected based on the second counter value.

Next, an operation for calculating the second counter value to generate the corrected image data will be described. With regard to a gradation value of a pixel (for example, a first pixel) of the reference image data is different from the gradation value of the input image data RGB data, the counter managing unit 130 determines a second counter value corresponding to the first pixel based on the first counter value corresponding to the first pixel and may initialize the first counter value corresponding to the first pixel. Before the second counter value is determined based on the first counter value, the counter managing unit 130 may determine whether the first counter value corresponding to the first pixel is set at an initial value (for example, 0). If the first counter value is set at the initial value (for example, 0), the gradation value of the first pixel may be corrected to a corrected gradation value based on the second counter value corresponding to the first pixel, and the second counter value corresponding to the first pixel may be decreased by a predetermined value (for example, 1).

For example, the second counter value may be determined by considering the first counter value as well as the number of frames occurring during a predetermined time. The predetermined time is a time during which correction is performed, for example, when the first counter value is equal to 1. For example, if the first counter value corresponding to the first pixel is equal to 1, the correction may be performed for one second. For example, if the first counter value corresponding to the first pixel is equal to 5, the second counter value corresponding to the first pixel may be determined as a value obtained by multiplying the first counter value corresponding to the first pixel by the number of frames during a predetermined time (for example, the number of frames for a second, for example, 60). In this case, the second counter value corresponding to the first pixel may be 300, and if the second counter value is decreased by 1 in each frame, a correction with regard to the first pixel is performed for five seconds. Since the second counter value corresponding to the first pixel gradually decreases over time, the correction value with regard to the first pixel also gradually decreases.

An operation which is performed in a predetermined time cycle (for example, a first time cycle) will now be described. If the gradation value of the reference image data for a pixel (for example, a fourth pixel) is different from the gradation value of the first image data and the gradation value of the input image data RGB data which is input in the first time cycle, that is, the first image data, the counter managing unit 130 determines a second counter value corresponding to the fourth pixel based on a first counter value corresponding to the fourth pixel and may set the first counter value corresponding to the fourth pixel. If the gradation value of the reference image data for a pixel (for example, a third pixel) is that same as the gradation value of the first image data, the counter managing unit 130 may increase a first counter value corresponding to the third pixel by an increment determined based on a gradation value of the third pixel. The counter managing unit 130 may further perform an operation for storing the first image data as the reference image data in the storage unit 150 (for example, a frame buffer).

According to a selective example, the counter managing unit 130 may decrease all second counter values that are greater than an initial value during every predetermined time cycle (for example, a second time cycle), by a predetermined value. For example, the second time cycle may be one second. The counter managing unit 130 may all decrease every second counter value by a predetermined value (for example, 60). For example, since the second counter values always need to be greater than the initial value (for example, 0), second counter values, which are greater than the initial value (for example, 0) but less than or equal to a predetermined value (for example, 60), may all be changed to 0 after the second time cycle. For example, when the second time cycle is a frame time (for example, 1/60 second), the predetermined value is equal to 1.

The correction unit 140 generates corrected image data by correcting the input image data per pixel based on the second counter value. If the gradation value of input image data for a pixel (for example, a first pixel) is different from the gradation value of the reference image data, the correction unit 140 determines a variation based on a gradation value of the first pixel of the input image data RGB data and the second counter value corresponding to the first pixel and may generate a corrected gradation value of the first pixel by changing the gradation value of the first pixel of the input image data RGB data by the variation. If the gradation value of input image data RGB data for a pixel (for example, a second pixel) is the same as the gradation value of the reference image data, the correction unit 140 may determine a corrected gradation value of the second pixel such that the corrected gradation value of the second pixel may become the same as the gradation value of the second pixel. The correction unit 140 may generate the Cdata by generating corrected gradation values of all pixels P as described above.

The variation, which is a difference between the corrected gradation value of the first pixel and the gradation value thereof, may increase in proportion to an increase of the second counter value corresponding to the first pixel. For example, if the gradation value of the first pixel is equal to 128, the corrected gradation value of the first pixel may be equal to 138 if the second counter value is equal to 100. If the second counter value is equal to 50, the corrected gradation value of the first pixel may be equal to 133. The correction unit 140 may store a look-up table in which the gradation value of the first pixel and the corrected gradation value of the first pixel, which is determined according to the second counter value, are stored. The correction unit 140 may determine the corrected gradation value of the first pixel based on the look-up table. The correction unit 140 may not correct the gradation value of the first pixel if the second counter value is equal to 0.

Thus, the display apparatus and the display control apparatus according to exemplary embodiments of the present invention may not be affected by afterimages that may be generated when the display apparatus and the display control apparatus do not emit light at an intended brightness. That is when the display apparatus and/or the display control apparatus of exemplary embodiments of the present invention emit light for a long time at the same brightness, because of the hysteresis properties of a thin film transistor (TFT), these display apparatuses and/or display control apparatuses may emit light at a different brightness.

Thus, in the display apparatus and the display control apparatus, the occurrence of image sticking due to pixels having different emission times may be prevented, and thus, a lifetime of the display apparatus may be improved.

Figure 3:
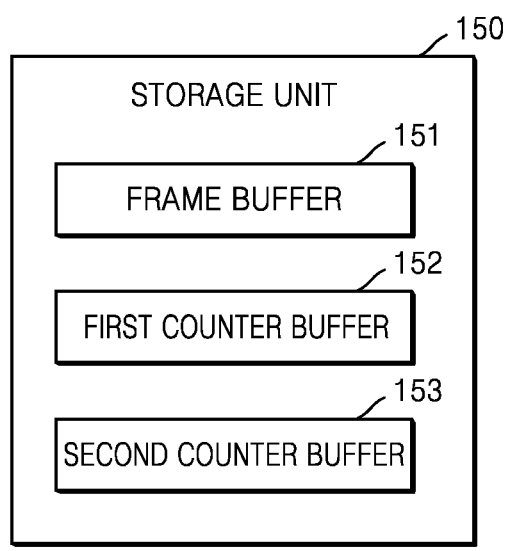
FIG. 3 illustrates a storage unit according to an exemplary embodiment of the present invention.

FIG. 3 illustrates the storage unit 150 according to an exemplary embodiment of the present invention.

Referring to FIG. 3, the storage unit 150 includes a frame buffer 151, a first counter buffer 152, and a second counter buffer 153.

The frame buffer 151 may store the reference image data, the first counter buffer 152 may store a first counter value for each pixel, and the second counter buffer 153 may store a second counter value for each pixel. The frame buffer 151, the first counter buffer 152, and the second counter buffer 153 may store data for each pixel. Although not shown in FIG. 3, the storage unit 150 may further include a frame memory which stores input image data, that is, current frame data. In this case, the reception unit 110 may store the input image data in the frame memory of the storage unit 150.

Figure 4:
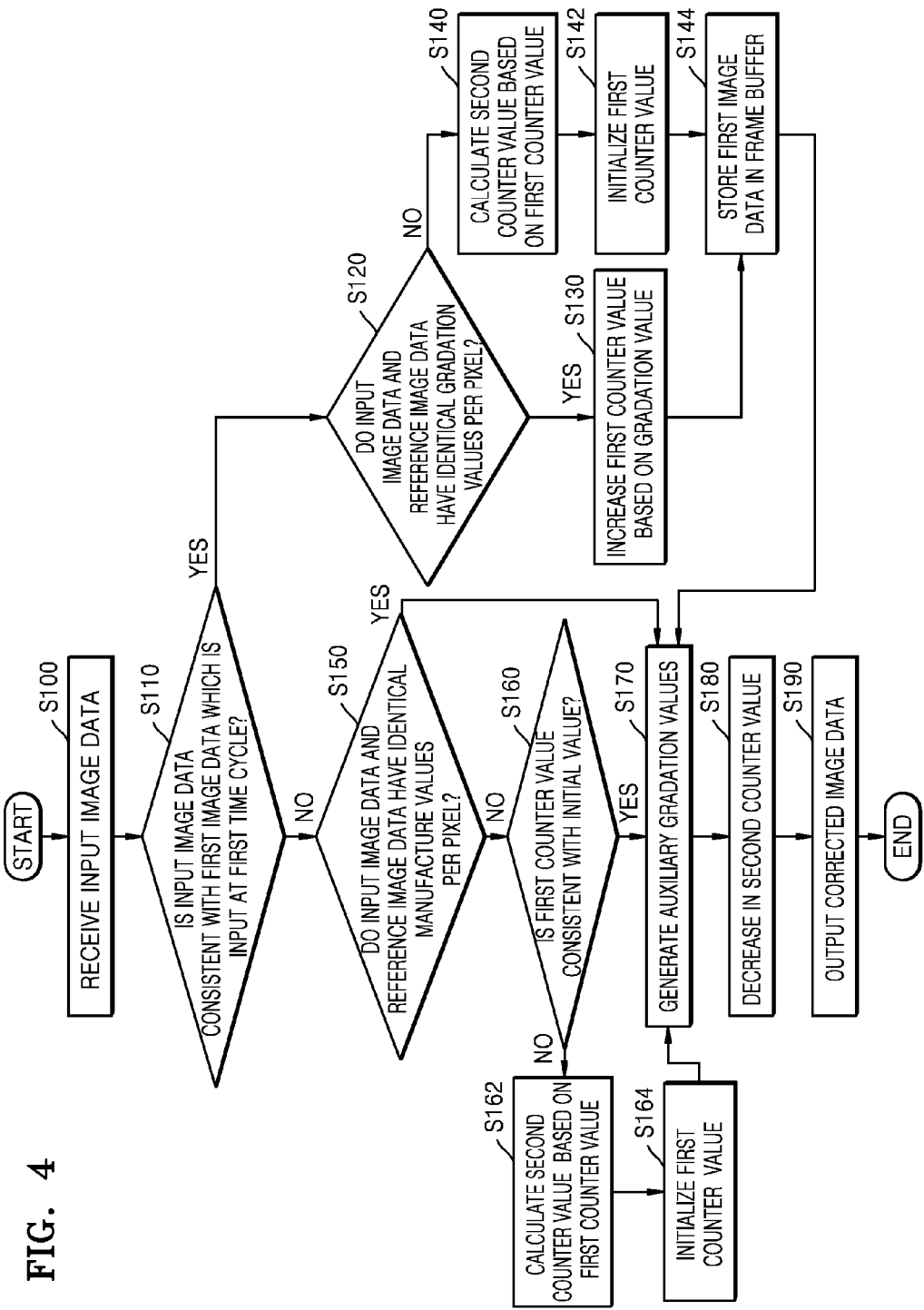
FIG. 4 is a flowchart of a display method according to an exemplary embodiment of the present invention.

FIG. 4 is a flowchart of a display method according to an exemplary embodiment of the present invention.

Referring to FIG. 4, a process performed by the display apparatus 10 includes receiving external input image data according to an exemplary embodiment of the present invention.

In operation S100, the reception unit 110 receives the external input image data. The external input image data (or input image data) may be stored in a frame memory of the controller 100 and may be referred to as "current frame data."

In operation S110, the controller 100 may determine whether the input image data is image data (for example, first image data) which is input in a predetermined time cycle (for example, a first time cycle). If it is determined in operation S110 that the input image data is the first image data which is input in the first time cycle, operation S120 may be performed. If the input image data is not the first image data which is input in the first time cycle, operation S150 may be performed.

If it is determined in operation S110 that the input image data is the first image data which is input in the first time cycle, the controller 100 may compare a gradation value of the reference image data stored in the frame buffer 151 and a gradation value of the first image data that is input in the first time cycle, for each pixel, in operation S120. Image data among the input image data which is input in the first time cycle from may be referred to as first image data.

After the gradation values of the reference image data and the first image data are compared in operation S120, if the gradation value of the reference image data for a pixel (for example, a third pixel) is the same as the gradation value of the first image data, a first counter value corresponding to the third pixel may be increased based on a gradation value of the third pixel in operation S130. An increased value of the first counter value may be proportional to the gradation value of the third pixel.

After the gradation values of the reference image data and the first image data are compared in operation S120, if the gradation value of the reference image data for a pixel (for example, a fourth pixel) is different from the gradation value of the first image data, a second counter value corresponding to the fourth pixel may be calculated based on a first counter value corresponding to the fourth pixel in operation S140. The second counter value may be proportional to the first counter value and may be a standard value used to determine a correction value and period of gradation values of the pixels. Then, in operation S142, the first counter value corresponding to the fourth pixel may be set. In subsequent frames, the gradation value of the fourth pixel may be kept the same for a long time, so the gradation value of the fourth pixel and a period for which the gradation value of the fourth pixel is kept the same may be stored by using the initialized first counter value.

A first counter value corresponding to every pixel in the first image data may be determined through operations S130, S140, and S142. In operation S144, the first image data received by the reception unit 110 may be moved to and stored in the frame buffer 151. The first image data moved to the frame buffer 151 may be stored for the first time cycle. In operation S170, corrected gradation values of the third pixel and the fourth pixel may be generated.

If it is determined in operation S110 that the input image data is not the first image data which is input in the first time cycle, the controller 100 may, in operation S150, compare the gradation value of the reference image data stored in the frame buffer 151 to the gradation value of the input image data received by the reception unit 110 for each pixel.

After the gradation value of the reference image data and the gradation value of the input image data are compared in operation S150, if the gradation value of the reference image data for a pixel (for example, a first pixel) is different from the gradation value of the input image data, a determination as to whether a first counter value corresponding to the first pixel is equal to an initial value (for example, 0) may be made in operation S160.

After the determination is made in operation S160, if the first counter value corresponding to the first pixel is equal to the initial value (for example, 0), a corrected gradation value of the first pixel may be generated in operation S170.

After the determination is made in operation S160, if the first counter value corresponding to the first pixel is not equal to the initial value (for example, 0), a second counter value corresponding to the first pixel may be calculated based on the first counter value corresponding to the first pixel. The second counter value may be proportional to the first counter value and may be a standard value used to determine a correction value and period of gradation values of pixels. Then, in operation S164, the first counter value corresponding to the fourth pixel may be set. In operation S170, a corrected gradation value of the first pixel may be generated.

After the gradation value of the reference image data and the gradation value of the input image data are compared in operation S150, if the gradation value of the reference image data for a pixel (for example, a second pixel) is the same as the gradation value of the input image data, a corrected gradation value of the second pixel may be generated in operation S170. In this case, the second pixel may not be corrected, and thus, the corrected gradation value of the second pixel may be equal to the gradation value thereof.

In operation S170, the gradation value of the input image data may be corrected. In particular, if the gradation value of the reference image data for a pixel (for example, a third pixel) is the same as the gradation value of the first input image data and the gradation value of the reference image data for a pixel (for example, a second pixel) is the same as the gradation value of the input image data, since the second and third pixels have the same gradation value as the reference image data, the gradation values may not be corrected. Therefore, the corrected gradation values of the second and third pixels may be the same as the gradation values thereof.

If the gradation value of the reference data for a pixel (for example, a fourth pixel) is different from the gradation value of the first image data, a corrected gradation value of the fourth pixel may be generated based on a second counter value corresponding to the fourth pixel. The corrected gradation value of the fourth pixel may be determined based on the gradation value of the fourth pixel and the second counter value corresponding to the fourth pixel. For example, the corrected gradation value of the fourth pixel may be determined by using a look-up table. For example, the controller 100 may determine a variation based on the gradation value of the fourth pixel and the second counter value corresponding to the fourth pixel, and the determined variation may be added to the gradation value of the fourth pixel so as to generate the corrected gradation value of the fourth pixel. The variation may be based on the second counter value corresponding to the fourth pixel and may be, for example, in proportion to the second counter value. However, a relationship between the variation and the second counter value is not limited thereto. For example, if the second counter value corresponding to the fourth pixel is an initial value (for example, 0), the gradation value of the fourth pixel is not corrected, and the corrected gradation value of the fourth pixel may be equal to the gradation value of the fourth pixel.

If the gradation value of the reference image data for a pixel (for example, a first pixel) is different from the gradation value of the input image data, the corrected gradation value of the first pixel may be based on the second counter value corresponding to the first pixel. The corrected gradation value of the first pixel may be determined based on the gradation value of the first pixel and the second counter value corresponding to the first pixel. For example, the controller 100 determines a variation based on the gradation value of the first pixel and the second counter value corresponding to the first pixel and adds the variation to the gradation value of the first pixel, thereby generating the corrected gradation value of the first pixel. The variation may be generated based on gradation value of the first pixel and the second counter value corresponding to the first pixel. For example, if the second counter value corresponding to the first pixel is an initial value (for example, 0), the gradation value of the first pixel is not corrected, and the corrected gradation value of the first pixel may be equal to the gradation value of the first pixel.

In operation S170, a corrected gradation value for every pixel in the input image data, which in this case includes the first through fourth pixels, may be generated. The Cdata may include the corrected gradation value for every pixel.

In operation S180, the above second counter values may be decreased to predetermined values. As described above, the second counter values may be standard values used to determine a correction period. In operation S180, the correction period may be determined by decreasing the second counter values. The second counter values may be equal to or greater than the initial value (for example, 0). Therefore, second counter values which are equal to or greater than the initial value may be decreased to a predetermined value in operation S180. For example, the predetermined value may be equal to 1.

In operation S190, the controller 100 may output the Cdata generated in operation S170 to the source driver 400. The source driver 400 generates data signals based on the Cdata and sends the generated data signals to pixels P. Then, the pixels P displays an image corresponding to the Cdata, and thus, an image fixture problem occurring when some pixels emit light for a long time at a constant brightness, may be solved.

Figure 5:
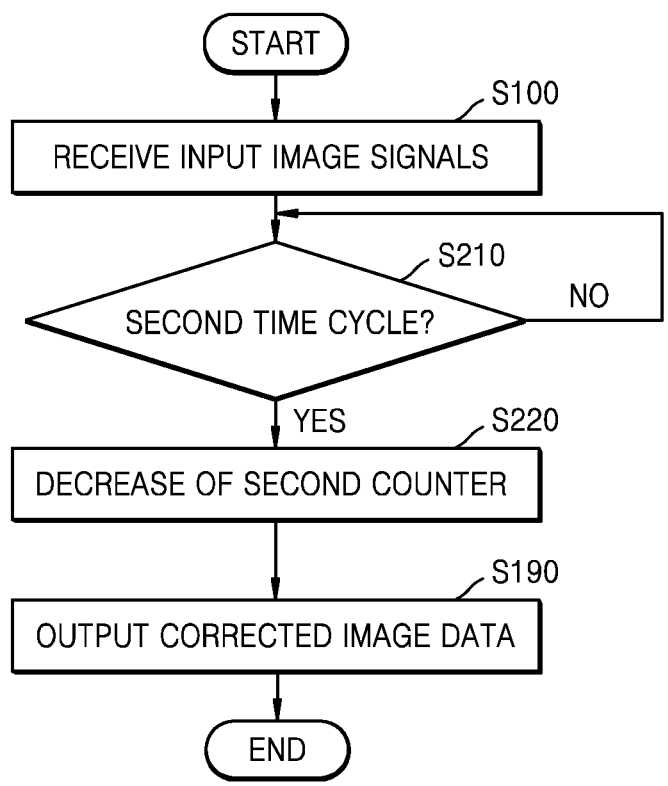
FIG. 5 is a flowchart of a display method according to an exemplary embodiment of the present invention.

FIG. 5 is a flowchart of a display method according to an exemplary embodiment of the present invention.

Referring to FIG. 5, an operation decreasing second counter values may be separately performed, unlike the described order of FIG. 4. According to the embodiment shown in FIG. 5, operation S210, in which a time cycle is determined, and operation S220, in which the second counter values are decreased, are further performed between operation S100, in which the input image data is received, and operation S190, in which the corrected image data is output.

In operation S210, it may be determined whether a current time corresponds to a predetermined time cycle (for example, a second time cycle). In operation S220, if the current time corresponds to the second time cycle, the second counter values, which are equal to or greater than an initial value, may be all decreased by a predetermined value. The second counter values, which are greater than an initial value but less than the predetermined value, may be decreased by the initial value in operation S220.

As the second counter values decrease in a separate operation which is different from operation S180 of FIG. 4, it is unnecessary to decrease a second counter value in every frame, and thus, the number of operations may be decreased.

The use of the terms "a", "an", "the", and similar referents in the context of describing the present embodiments (especially, in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein.

The steps of all methods described herein can be performed in any suitable order unless otherwise indicated herein or clearly contradicted by the context. The use of any and all examples, or exemplary language (e.g., "such as") provided herein, is intended merely to better illuminate the present embodiments and does not pose a limitation on the scope of the thereof unless otherwise claimed. Numerous modifications and adaptations will be readily apparent to one of ordinary skill in the art without departing from the spirit and scope of the present invention.

As described above, according to the one or more of the above exemplary embodiments, a display apparatus and a display control apparatus may prevent image sticking which occurs when some pixels emit light of the same brightness for a long time.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A display apparatus, comprising:
    a pixel configured to display an image; and
    at least one processor configured to:
        determine a first counter value for the pixel in proportion to a difference in a gradation value of reference image data for the pixel and a gradation value of input image data for the pixel, the determination of the first counter value being further based on a second counter value of the pixel;
        set, after determination of the first counter value, the second counter value for the pixel to an initialization value;
        generate corrected image data via correction of the input image data for the pixel based on the first counter value, the corrected image data comprising a corrected gradation value for the first pixel generated according to the difference and the first counter value; and
        cause, at least in part, the pixel to display the image according to the corrected image data.

2. The display apparatus of claim 1, wherein a time period for the correction of the input image data is configured to increase proportionately with an increase in the first counter value.

3. The display apparatus of claim 1, wherein the at least one processor is further configured to:
    decrease, after generation of the corrected image signal, the first counter value.

4. The display apparatus of claim 3, wherein the at least one processor is configured to decrease the first counter value by a set value.

5. The display apparatus of claim 1, wherein the at least one processor is further configured to:
    determine, in response to the gradation value of the reference image data being equivalent to the gradation value of the input image data, the second counter value according to the gradation value of the input image data.

6. The display apparatus of claim 1, wherein the at least one processor is configured to decrease the first counter value by a set value in response to expiration of a set time period.

7. The display apparatus of claim 1, wherein:
    the input image data is associated with a first time period; and
    the at least one processor is further configured to cause, at least in part, the input image data to be stored as reference image data for the pixel in association with a second time period.

8. The display apparatus of claim 5, wherein:
    the input image data is associated with a first time period; and
    the at least one processor is further configured to, after determination of the second counter value, cause, at least in part, the input image data to be stored as referenced image data for the pixel in association with a second time period.

9. The display apparatus of claim 1, wherein the at least one processor is further configured to:
    determine, before generation of the corrected image data, that the a second counter value corresponds to an initialization value.

10. A display control apparatus, comprising:
    a frame buffer configured to store reference image data for a pixel;
    a frame memory configured to receive input image data for the pixel; and
    at least one processor configured to:
        determine, in response to a difference between a gradation value for the input image data and a gradation value for the reference image data, a first counter value for the pixel based on a second counter value for the pixel;

initialize, in response to the determination of the first counter value, the second counter value;

generate a gradation correction value for the pixel based on the first counter value and the difference.

11. The display control apparatus of claim 10, wherein the at least one processor is further configured to:

determine, before the determination of the first counter value, that the second counter value is greater than an initialization value.

12. The display control apparatus of claim 10, wherein the at least one processor is further configured to:

decrease the second counter value for the pixel by a predetermined amount.

13. The display control apparatus of claim 10, wherein the at least one processor is further configured to:

increase, in response to an equivalence between the gradation value for the input image data and the gradation value for the reference image data, the second counter value based on the gradation value for the input image data.

14. The display control apparatus of claim 10, wherein:

the input image data is associated with a first time period; and the at least one processor is further configured to:

store, in the frame buffer, the input image data as reference image data for the pixel for a second time period.

15. The display control apparatus of claim 10, wherein the determination of the first counter value is further based on a predetermined number of frames in a predetermined time period.

\* \* \* \* \*